Feb. 25, 1964   J. L. SCHOHL   3,121,952
CULINARY IMPLEMENT
Filed March 13, 1961   2 Sheets-Sheet 1
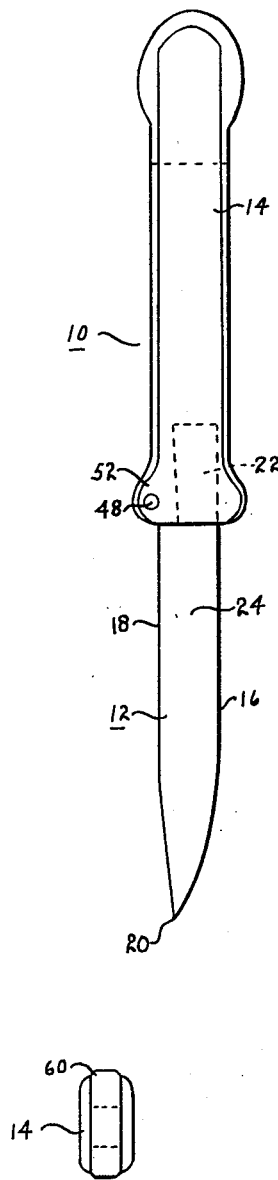
FIG. 1
FIG. 3
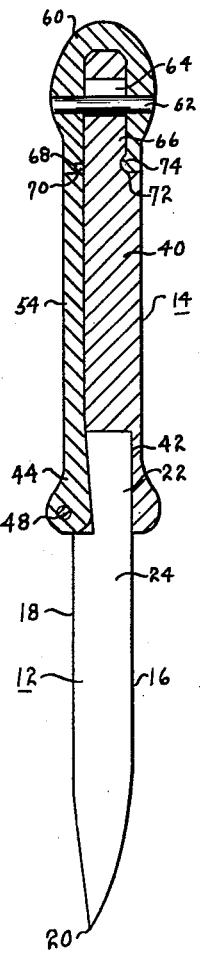
FIG. 4
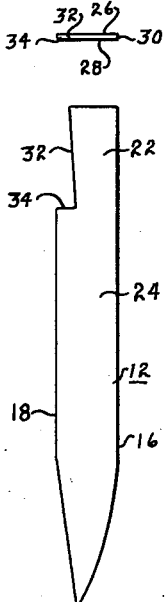
FIG. 2
FIG. 7
FIG. 6
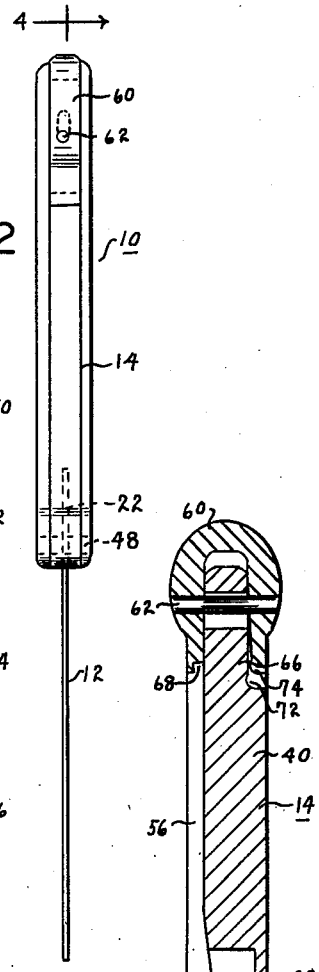
FIG. 5
*INVENTOR.*
JOHN L. SCHOHL
BY *M. A. Hobbs*
ATTORNEY Feb. 25, 1964   J. L. SCHOHL   3,121,952
CULINARY IMPLEMENT Filed March 13, 1961   2 Sheets-Sheet 2

INVENTOR.
JOHN L. SCHOHL
BY M.A. Hobbs
ATTORNEY 3,121,952
CULINARY IMPLEMENT
John L. Schohl, 1711 Hoover St., South Bend, Ind.
Filed Mar. 13, 1961, Ser. No. 95,058
2 Claims. (Cl. 30—331)

The present invention relates to culinary implements and more particularly to paring and carving knives and similar culinary instruments.

The paring and carving knives used in the home are frequently permitted to become dull and often are never sharpened since the housewife has neither the equipment nor skill necessary to perform the sharpening operation properly, or, if an attempt is made to sharpen the knives, the blades are poorly sharpened or are only partially sharpened along the length, thus leaving the knife in unsatisfactory condition for further use. Further repeated sharpening of the knife frequently results in an incorrect curvature of the blade, and often with a dull, unsharpened point. In view of the difficulties in maintaining the knives in proper condition, the housewife or chef in commercial establishments will continue to use the knives as they become progressively unsatisfactory until it is necessary to replace the knives or send them to a skilled knife sharpener. It is, therefore, one of the principal objects of the present invention to provide a knife primarily for use in the preparation of foods, having a replaceable blade which can readily be inserted in a handle and held securely therein as long as it is used, and which can be easily and safely removed and replaced.

Another object of the invention is to provide a paring or carving knife having a removable blade which is locked securely in place with the use of a compact means substantially concealed and fully retracted to a position in the handle where it will not interfere with the normal use of the knife.

Still another object of the invention is to provide a knife of the aforesaid type in which the removable blade is held in place by a means which grips and locks the blade in place in the handle and retracts fully within the confines of the handle, and which is not adversely affected in its operation by the use of the knife in water or on moist, gritty, greasy and dirty materials.

A further object is to provide a knife with a removable blade having a blade securing means which increases its gripping action on the blade in resistance to any force on the blade tending to remove it from the handle, and which can easily be operated without the use of tools and without any skill or practice.

Additional objects and advantages of the invention will become apparent from the following description and accompanying drawings, wherein:

FIGURE 1 is a side elevational view of a paring knife or the like embodying the present invention;

FIGURE 2 is an edge elevational view of the knife shown in FIGURE 1;

FIGURE 3 is an end elevational view of the knife shown in the preceding figures;

FIGURE 4 is a longitudinal cross-sectional view through the knife shown in the preceding figures, taken on line 4—4 of FIGURE 2;

FIGURE 5 is a longitudinal cross-sectional view of the knife shown in the preceding figures, the section being taken on the same line as the section of FIGURE 4, with the blade thereof removed from the handle;

FIGURE 6 is a side elevational view of the blade removed from the handle shown in FIGURE 5;

FIGURE 7 is an end elevational view of the blade shown in FIGURE 6;

Figure 8:
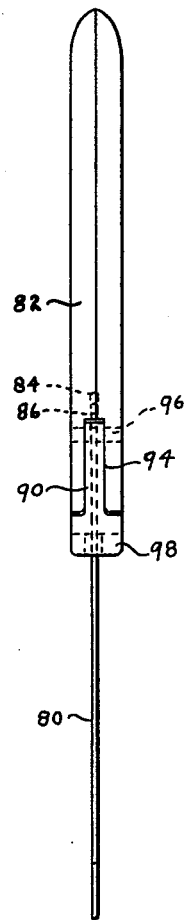
FIGURE 8 is an edge elevational view of a modified form of a knife embodying the present invention.

With reference to the drawings and to the embodiment of the present invention shown in FIGURES 1 through 7, numeral 10 designates the complete knife with the removable blade 12 assembled in proper operating position in the handle 14, the final assembled knife structure being substantially the same as the conventional knife, both in shape, outward construction, appearance and materials from which the blade and handle are made. Blade 12 may be of any desired shape, that shown being considered conventional for the purpose of the present description as far as the portion which is exposed beyond the end of the handle is concerned, numeral 16 indicating the cutting edge, 18 the back, and 20 the point thereof. The particular blade shown in the drawings has a butt 22 formed integrally with the main portion 24 of the blade and having three straight sides 26, 28 and 30, and a forwardly and inwardly tapered edge 32 terminating at a shoulder 34 at the inner end of butt 22. The main portion of the blade 24 and butt 22 are formed as an integrated unit of suitable tool steel, and machined to the desired shape with relatively close tolerance being maintained between edges 30 and 32.

The handle 14 consists of a body portion 40 of elongated, generally rectangular shape having a slot 42 in the forward end thereof of the same shape as butt 22 on the sides corresponding to sides 26, 28 and 30. The forward end of the slot is open so that butt 22 can be slipped into the slot. The side of slot 42 corresponding to tapered edge 32 is open, and the butt 22 is initially loosely seated in the slot when the blade is inserted in the handle. In order to secure the blade firmly in the handle and hold it rigidly therein until it is intentionally removed, a cam lever 44 having a cam surface 46 engages tapered edge 32 and applies sufficient pressure to firmly seat the butt in slot 42 when the lever is moved from its unlocked position as shown in FIGURE 5 to its locked position shown in FIGURE 4. The cam lever 44 is pivoted on a pin 48 extending through outwardly extending edges 50 and 52 of body 40, and cam surface 46 is so contoured that it progressively engages tapered edge 32 as the lever is moved from its unlocked to its locked position. Lever 44 is provided with an extension 54 which seats in a longitudinal groove 56 of body portion 40 when lever 44 is moved to its fully locked position as shown in FIGURE 4. When the lever is in its fully locked position, cam surface 46 engages tapered edge 32 throughout substantially its full length.

While lever 44 with its extension 54 tends to remain in its fully locked position, in order to avoid any possibility of accidental release of the blade, the lever is latched in its locked position by a latch mechanism consisting of an end member 60 mounted for longitudinal movement on the end of handle body 40 and held in place by a pin 62 extending through member 60 and through an elongated slot 64 near the end of reduced body portion 66. As shown in FIGURE 2, the side walls of body 40, which are preferably formed integrally with the main portion of the body, project outwardly along the sides of member 60 so that the member is substantially enclosed within the body. The main body portion and the two sides may be initially formed separately and then permanently joined together by any suitable securing means. Member 60 contains an inner groove 68 for receiving an offset extension 70 of lever 44. When the lever has been moved to its fully locked position within groove 56, member 60 is moved from its retracted position shown in FIGURE 5 to that shown in FIGURE 4, shoulder 68 slipping over projection 70 and retaining lever 44 in its locked position. In order to release lever 44 so that it can be raised to remove blade 12, member 60 is merely moved end-wise to the position shown in FIGURE 5, thus disengaging shoulder 68 from projection 70 and permitting lever 44 to be lifted from groove 56 and moved to the position shown in FIGURE 5.

In order to hold member 60 in its latching position, an interlocking recess and projection, 72 and 74, respectively, are provided on the inner end of member 60. When member 60 is moved to its latched position, projection 74 slips into slot 72 and resists movement of member 60 from the latched position. However, a slight additional force causes member 60 to rock slightly and sufficiently to release projection 74 from recess 72 so that the member can easily or freely be moved to its fully unlatched position shown in FIGURE 5.

When a new blade is to be substituted for the old blade in the knife, the operator first retracts member 60 from the position shown in FIGURE 4 to that shown in FIGURE 5, thus releasing extension 54 of lever 44 so that the lever can be moved from the position of the former figure to the latter figure. After the lever has been moved to its fully raised position, blade 12 can easily be lifted from slot 42, or, if the handle is inverted to the position shown in FIGURE 5, the blade will drop of its own weight from slot 42. A new blade is then inserted in the handle with butt 22 seated in slot 42, and lever 44 and extension 54 are pivoted from the position shown in FIGURE 5 to that shown in FIGURE 4, and member 60 is again returned to its latched position with shoulder 68 overlapping projection 70 and with projection 74 seated in recess 72. Since cam surface 46 firmly engages tapered surface 32 of blade 12, the blade not only remains seated in slot 42 but is held rigidly in the slot so that the knife can be used in the same manner as any conventional one-piece unit.

Figure 9:
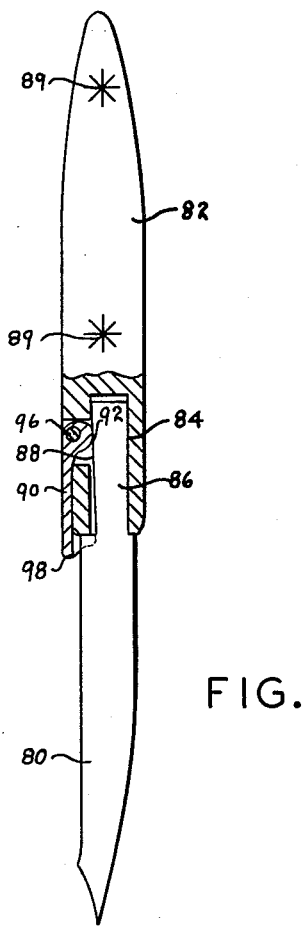
FIGURE 9 is a side elevational and partial cross-sectional view of the knife shown in FIGURE 8.

A modified form of the present invention is illustrated in FIGURES 8 and 9 in which a somewhat different blade and handle design are employed. Blade 80 beyond the end of handle 82 is somewhat different in configuration from that shown in the preceding figures, but is still intended merely to illustrate the invention embodied in the knife structure. In this modification, most of the handle portion is of solid structure in which a slot 84 is provided in the forward end thereof for receiving butt 86 of knife blade 80, the butt being substantially the same shape as the one previously described herein, i.e. rectangular in shape throughout with the exception of tapered edge 88. The handle may be formed in two longitudinal halves secured together by rivets 89. The blade is held firmly in slot 84 by a cam lever 90 having a cam surface 92 for engaging tapered surface 88 of butt 86 and holding the blade rigidly in slot 84. Lever 90 is seated in a longitudinal groove 94 paralleling slot 84 and is pivoted on a pin 96 extending through the sides of handle 82. The forward end of lever 90 is provided with a grip 98 to assist in raising the lever from its locked position, as shown in FIGURE 9, to its extended position with cam surface 92 disengaged from tapered surface 88.

When a used blade is to be replaced by a new blade, lever 90 is raised from the position shown in FIGURE 9 to a laterally extending position, disengaging cam surface 92 from tapered surface 88 and releasing the blade 80 which can now easily be lifted from slot 84 or permitted to fall therefrom by merely inverting the handle to the position shown in the drawings. After a new blade has been inserted in the slot 84, lever 90 is again returned to groove 94, thus causing cam surface 92 to engage tapered surface 88 and thereby seat butt 86 rigidly in the handle. The structure of FIGURES 8 and 9 is somewhat more compact than that shown in the preceding figures and can be operated with fewer manipulations in replacing the blade.

While only two embodiments of the present invention have been described and shown in detail herein, various modifications and changes may be made without departing from the scope of the invention.

I claim:

1. A knife having a throw-away blade comprising a blade having a cutting portion and a butt portion, said butt portion having two sides and an edge extending parallel with the sides and edge of the cutting portion and an inwardly and forwardly extending straight tapered edge, a handle having a slot of substantially the same size and shape as said butt portion and a longitudinal groove along one edge connected with said slot, a lever pivoted on said handle adjacent said slot and movable into and from said groove, a cam surface on said lever adjacent said pivot for engaging said tapered edge to hold said butt portion rigidly in said slot when said lever is rotated on the pivot away from said blade, a longitudinally movable member mounted on the end of said handle opposite said blade and having a shoulder for engaging and latching said lever in said groove, and a detent for retaining said member in its latched position.

2. A knife comprising a blade having a cutting portion and a butt portion with an inwardly and forwardly extending straight tapered edge throughout its length, a handle having a slot of substantially the same size and shape as said butt portion and a longitudinal groove along one edge connected with said slot, a lever pivoted on said handle adjacent said slot and movable into and from said groove, a cam surface on said lever adjacent said pivot for engaging said tapered edge of the butt portion to hold said blade on said handle, and a longitudinally movable member mounted on the end of said handle opposite said blade and having a part for engaging and latching said lever in said groove.

References Cited in the file of this patent

UNITED STATES PATENTS

| | | |
|---|---|---|
| 719,785 | Garda | Feb. 3, 1903 |
| 832,481 | Hubby | Oct. 2, 1906 |
| 1,018,210 | Segel et al. | Feb. 20, 1912 |
| 1,204,622 | Wallace | Nov. 14, 1916 |
| 1,507,043 | Blow | Sept. 2, 1924 |
| 1,625,778 | Nickerson | Apr. 19, 1927 |
| 1,813,723 | Beaver | July 7, 1931 |
| 1,998,188 | Dunn | Apr. 16, 1935 |
| 2,695,450 | Platts | Nov. 30, 1954 |
| 2,751,684 | Parker | June 26, 1956 |

FOREIGN PATENTS

| | | |
|---|---|---|
| 415,606 | Great Britain | Aug. 30, 1934 |